United States Patent
Moody et al.

(10) Patent No.: US 10,108,694 B1
(45) Date of Patent: Oct. 23, 2018

(54) CONTENT CLUSTERING

(71) Applicant: Google Inc., Mountain View, CA (US)

(72) Inventors: Paul Brian Moody, Mountain View, CA (US); Rudolf Michael Galfi, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 319 days.

(21) Appl. No.: 14/681,967

(22) Filed: Apr. 8, 2015

(51) Int. Cl.
*G06F 7/02* (2006.01)
*G06F 17/30* (2006.01)
*G06Q 50/00* (2012.01)

(52) U.S. Cl.
CPC .... *G06F 17/30598* (2013.01); *G06F 17/3053* (2013.01); *G06F 17/30525* (2013.01); *G06F 17/30864* (2013.01); *G06Q 50/01* (2013.01)

(58) Field of Classification Search
CPC ......... G06F 17/30598; G06F 17/30525; G06F 17/3053; G06F 17/30554; G06F 17/30864
See application file for complete search history.

(56) References Cited

U.S. PATENT DOCUMENTS

| 9,230,280 | B1 * | 1/2016 | Maag | G06Q 40/00 |
| 2006/0248053 | A1 * | 11/2006 | Sanfilippo | G06F 17/3071 |
| 2012/0311039 | A1 * | 12/2012 | Ogawa | G06Q 10/00 |
| | | | | 709/204 |
| 2014/0129559 | A1 * | 5/2014 | Estes | G06F 17/30424 |
| | | | | 707/737 |
| 2014/0156743 | A1 * | 6/2014 | Veda | G06Q 10/10 |
| | | | | 709/204 |
| 2014/0324982 | A1 * | 10/2014 | Agrawal | H04L 65/403 |
| | | | | 709/206 |
| 2014/0365486 | A1 * | 12/2014 | Morris | G06F 17/30997 |
| | | | | 707/736 |
| 2016/0092551 | A1 * | 3/2016 | Tang | H04L 51/32 |
| | | | | 707/740 |
| 2016/0189040 | A1 * | 6/2016 | Vickrey | G06N 5/04 |
| | | | | 706/12 |
| 2016/0232241 | A1 * | 8/2016 | Stoyanov | G06F 17/30867 |
| 2017/0228792 | A1 * | 8/2017 | Storer | G06Q 30/0271 |

* cited by examiner

Primary Examiner — Bruce M Moser
(74) Attorney, Agent, or Firm — Patent Law Works LLP

(57) ABSTRACT

A method for clustering content is disclosed. The method reduces the likelihood that unrelated content is included in a cluster, allows users to more discover content and content is automatically curated. A collection of posts is associated with a common tag. A seed post is identified from the collection of posts. The collection of posts is grouped into a first cluster of posts based on the seed post and a first attribute. The collection of posts is grouped into a second cluster of posts based on the seed post and a second attribute. A preferred view is determined from at least one or more of: the first cluster and the second cluster. The preferred view is provided for display. Unrelated content includes topically unrelated posts, posts by users unrelated to a seed user, posts by users unrelated to the seed post in an activity graph.

21 Claims, 12 Drawing Sheets

CONTENT CLUSTERING

BACKGROUND

The present disclosure relates to content clustering. More specifically, the present disclosure relates to the clustering of content posts on a social network service.

On microblogging and social network services, users often provide a metadata tag or "tag" to messages. One common tag notation is with the '#' character followed by a string of alpha-numeric characters. A tag allows grouping of similarly tagged messages and helps users of microblogging or social network services to find content of a given topic.

Tags are often used in un-curated discussions to help route users to interesting content. Since tags are usually not controlled by a moderator, sometimes different content subject matter may inadvertently be labeled with the same tag. For instance, especially for homonyms, the tag '#ram' may be applied to posts by computer hardware enthusiast discussing the latest advances in computer memory. The same tag '#ram' may also be applied to posts by users discussing how durable and powerful their trucks are.

Tags are also sometimes used in conjunction with content rankings. Users can often affirm posts. By affirming a post, the post may be ranked higher in content rankings. Additionally, tags themselves sometimes may be ranked higher compared to other tags based on affirmations. Content posters sometimes may try to take advantage of highly ranked tags to get more viewership. This incentive to get more content viewers can cause different content subject matter to be labeled with the same tag and may make it more difficult to route users to the content they wish to consume.

SUMMARY

According to one innovative aspect of the subject matter described in this disclosure, a system includes a processor and a memory storing instructions that, when executed, cause the system to: identify a seed post from the collection of posts; group the collection of posts into a first cluster of posts based on the seed post and a first attribute; group the collection of posts into a second cluster of posts based on the seed post and a second attribute; determine a preferred view from at least one or more of: the first cluster and the second cluster; and provide for display the preferred view.

In general, another innovative aspect of the subject matter described in this disclosure may be embodied in methods that include: associating a collection of posts with a common tag; identifying a seed post from the collection of posts; grouping the collection of posts into a first cluster of posts based on the seed post and a first attribute; grouping the collection of posts into a second cluster of posts based on the seed post and a second attribute; determining a preferred view from at least one or more of: the first cluster and the second cluster; and providing for display the preferred view.

Other aspects include corresponding methods, systems, apparatus and computer program products for these and other innovative aspects.

These and other implementations may each optionally include one or more of the following features. For instance, the features may further include: grouping the collection of posts into a third cluster of posts based on the seed post and a third attribute. The first cluster, the second cluster and/or the third cluster may be provided for display. For instance, the features may further include: identifying a new seed post from the collection of posts, grouping the collection of posts into a third cluster of posts based on the new seed post and the first attribute; and grouping the collection of posts into a fourth cluster of posts based on the new seed post and the second attribute. For instance, the features may further include identifying a topic entity of the seed post, and grouping the collection of posts into a topical cluster of posts based on whether content of a post is associated with the topic entity. For instance, the features may further include identifying terms semantically related with a keyword; identifying a topic entity may include extracting the keyword from the seed post; the content of a post may be associated with the topic entity if the post includes terms semantically related with the keyword. For instance, the features may further include identifying an activity network for the seed post based on actions performed by one or more users on a social networking system to the seed post, and grouping the collection of posts into an activity cluster of posts based on the activity network. For instance, the features may further include that the activity network is based on one or more of the following actions on the social networking system, affirming a post, commenting on a post, and re-posting an existing post. For instance, the features may further include determining a user who posted the seed post, identifying explicit connections to the user on a social networking system, and grouping the collection of posts into a social cluster of posts based on the explicit connections to the user. For instance, the features may further include receiving a selection of posts to be acted upon by a user; and ranking posts presented in a content stream based on at least one or more of a topical cluster, an activity cluster, and a social cluster.

The present disclosure may be particularly advantageous in a number of respects. First, the system may allow users to more readily discover interesting content. Second, the clustering method reduces the likelihood that unrelated content is included in the cluster. Third, the method can perform accurate curation of content without need for any human user intervention. Moreover, users of microblogging and social networking service may have an increased level of enjoyment and use and may spend more time producing content for such sites.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

A system and method for clustering posts is described below. In some instances, content may be posts on a site or social networking service. In some instances, posts may be associated with one or more tags.

Figure 1:
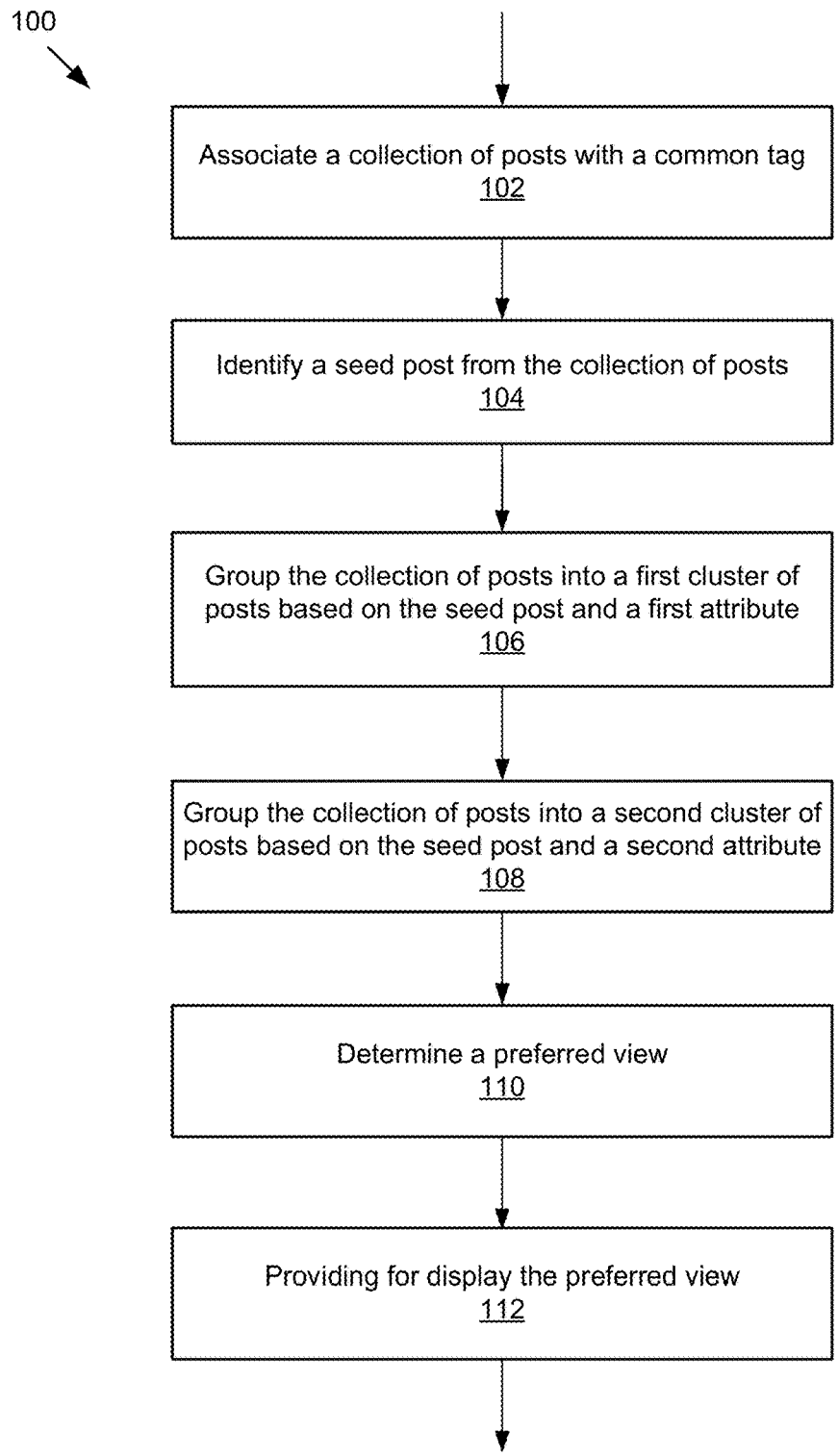
FIG. 1 is a flowchart of an example method for clustering content.

FIG. 1 is a flowchart of an example method 100 for clustering content. In some implementations, the method 100 for clustering content may be performed by a content clustering application 904. An example implementation of a content clustering application 904 is described in more detail below with reference to FIGS. 9 and 10. The content cluster application 904 includes a controller 1002, a topical module 1004, an activity module 1006, a social module 1008, a ranking module 1010, a recluster module 1012 and a graphical user interface (GUI) module 1014.

In some instances, the controller 1002 associates 102 a collection of posts with a common tag. For example, when a post is made with a tag, the controller 1002 may store the post and tag in a database. The database may have an index for tags and each tag may reference one or more posts. Likewise, each post may be referenced by any number of tags. Thus, in this example implementation, when the database is then queried with a given tag, the resultant collection of posts associated with the given tag may be returned.

In some implementations, the controller 1002 may also identify 104 a seed post from the collection of posts. In one example, the seed post may be selected by a user through the GUI module 1014 and communicated to the controller 1002. In some implementations, the seed post may be identified by being unassociated with any existing posts or may be posted by a given user. A seed post may be used by the method 100 as a starting point to analyze the collection of posts. As discussed below with greater detail, posts may be related by several different attributes or parameters. The seed post may be used as a point at which to begin processing these attributes or parameters and grouping clusters of posts together based on one or more attributes.

In some implementations, the seed post may be changed by identifying a new seed post. In doing so, the method 100 may be executed against the collection of posts from a different starting point. Reference made herein to "reclustering" or "reseeding" refers to running the implementations discussed herein against a newly identified seed post. In some examples, a user may explicitly select a new seed post using the GUI module 1014. In some examples, the new seed may be implicitly selected by the user based on actions the user takes to indicate approval or disapproval of various posts. In some examples, a new seed may be identified by trends amongst a group or users or all of the users on a system.

The collection of posts is grouped 106 into a first cluster of posts based on the seed post and a first attribute. In some instances, the topical module 1004 may perform this grouping. In some implementations, the activity module 1006 and/or the social module 1008 may perform this grouping. The topical module 1004, the activity module 1006 and the social module 1008 may group clusters based on different attributes. These modules are discussed with greater detail below with reference to FIG. 10. The collection of posts is also grouped 108 into a second cluster of posts based on the seed post and a second attribute. Likewise, this grouping may be performed by the topical module 1004, the activity module 1006, the social module 1008 and/or other attributes discernable in the collection of posts. In some implementations, the grouping of the first cluster is unique from the grouping of the second cluster. For example, the topical module 1004 may group the first cluster and the activity module 1006 may group the second cluster.

In some implementations, the GUI module 1014 or the ranking module 1010 may receive input from the user to determine 110 a preferred view. The preferred view may include the first cluster and/or the second cluster. Determining the preferred view may include ranking posts in a content stream based on the clustering. In one example, clusters that are tightly formed may be ranked higher. Further, in some instances, the GUI module 1014 may provide 112 the preferred view for display. In some instances, the GUI module 1014 cooperates with a display device to cause the preferred view to be displayed. Discussion of the GUI module 1014 is discussed in more detail below with reference to FIG. 10 and through example user interfaces in FIGS. 11 and 12. In some implementations, the groupings of collections may be analyzed and presentation conditioned on the grouping having more than a threshold number of post or presentation limited to presenting a number of post equal to or less than a threshold. For example, based on the platform in which the user is viewing the cluster of posts, the clusters maybe sized to the desktop presentation or presentation on a mobile device.

Figure 2:
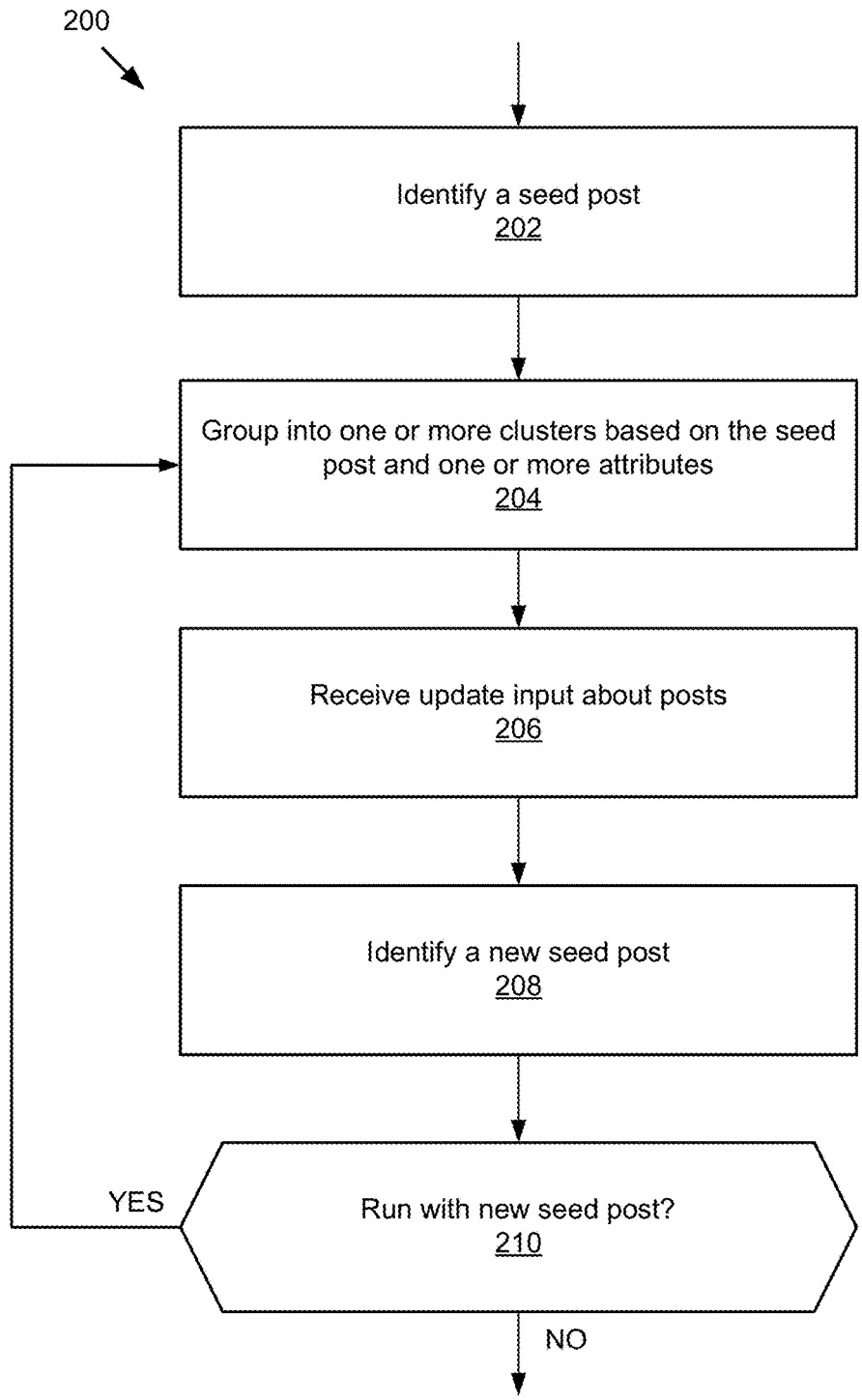
FIG. 2 is a flowchart of an example method for re-clustering content based on a new seed post.

FIG. 2 is a flowchart of an example method 200 for re-clustering content based on a new seed post. As discussed above, in some implementations the controller module 1002 identifies 202 a seed post. In one example, the seed post may be associated with a collection of posts with a common tag. The content clustering application 904 may group 204 the collection of posts into one or more clusters based on the seed post and one or more attributes. The content clustering application 904 may use the topical module 1004, the activity module 1006 and/or the social module 1008 to group the collection of posts into one or more clusters. The GUI module 1014 may receive 206 input about the posts. The recluster module 1012 responsive to the received input identifies 208 a new seed post and determines 210 whether to initiate running the method 200 with the new seed post. If so, the method 200, use the new seed post and continues to block 204 using the new seed post. If not, the method 200 continues. Thus, the technology may include grouping the collection of posts into a third cluster of posts based on the seed post and a third attribute. Moreover a preferred view may be determined from the first cluster, the second cluster and the third cluster. In this way, the method 200 may include identifying a new seed post from the collection of posts, grouping the collection of posts into a third cluster of posts based on the new seed post and the first attribute, and grouping the collection of posts into a fourth cluster of posts based on the new seed post and the second attribute. This process may be repeated any number of times to create different clusters.

Figure 3:
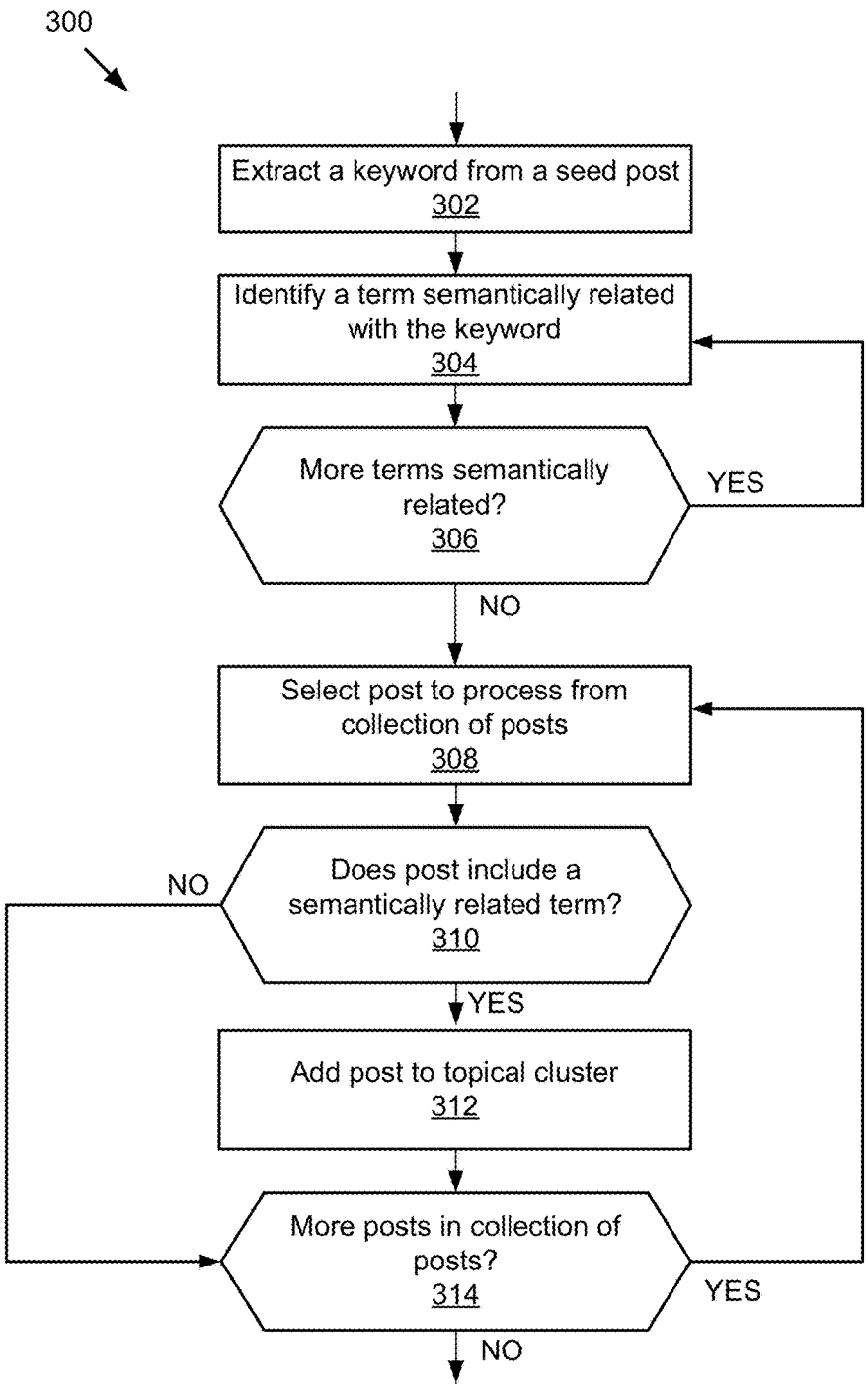
FIG. 3 is a flowchart of an example method for clustering content based on semantically related keywords.

FIG. 3 is a flowchart of an example method 300 for clustering content based on semantically related keywords. More specifically, the method 300 groups a collection of posts into a topical cluster of posts based on whether content of a post is associated with the topic entity. To do so, the method 300 identifies a topic entity of a seed post. In particular, a keyword is extracted 302 from a seed post. In one implementation, the topical module 1004 scans the text of a post to identify meaningful words to use as keywords.

In one example, commonly used words (e.g., 'the', 'be', 'to', 'of', 'and', etc.) that may not add significant contextual information are not included as keywords.

Once a keyword has been identified, a term semantically related with the keyword is identified 304. For instance, the keyword 'ram' might be semantically related to 'DRAM', 'MB', 'ROM', 'NAND', 'Hemi', 'Dodge®', etc. In some implementations, a keyword may be semantically related to a term where the semantic closeness between the keyword and term is above a threshold. Additionally, in some instances, identifying 304 semantically related terms may include finding second-order semantically related terms. For example, 'Hemi' may be a term semantically related to 'ram', but 'torque' may also be a term semantically related to 'Hemi'. Thus, in this example, the term 'torque' is a second-order semantically related term to the keyword 'ram'. Thus, once a semantically related term is identified 304, the method 300 determines whether there are more 306 semantically related terms. In this way, the method 300 includes an iterative search for terms semantically related with the keyword. Moreover, while the example method 300 refers to a single keyword, it should be noted that there may be two or more keywords for a given seed post, or in some instances, a seed post may have no extractable keywords. Further, there may be key word pairs or other combinations that are used as semantically related terms. In this way, one or more topic entities of the seed post may be identified.

The collection of posts is grouped into a topical cluster of posts based on whether content of a post is associated with the topic entity. To do so, a post from the collection of posts is selected 308. The method 300 then determines whether the selected post includes 310 a semantically related term. For instance, the text of the post may be scanned to identify whether the post includes a semantically related term. If the post does include a semantically related term, the post is added 312 to a topical cluster. Otherwise, if the post does not include a semantically related term, the post is not added to the topical cluster. Regardless of whether block 312 is performed, the method 300 then determines 314 whether there are more posts in the collection of posts to process. If there are, another post is selected 308 from the collection of posts and processed accordingly. If not the method 300 continues.

Figure 4:
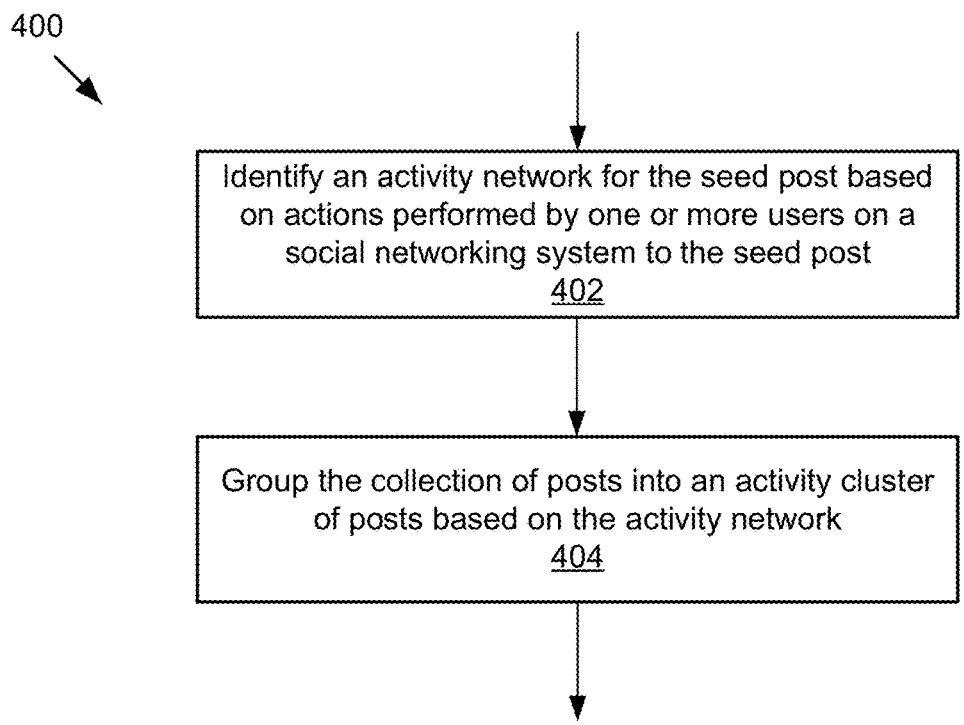
FIG. 4 is a flowchart of an example method for activity clustering of content.

FIG. 4 is a flowchart of an example method 400 clustering of content based on activity. The method 400 includes identifying 402 an activity network for the seed post based on actions performed by one or more users on a social networking system to the seed post. The activity network may be based on a variety of actions on the social networking system. For instance, a user affirming a post, commenting on a post, and/or re-posting an existing post on the social network may contribute to the activity network. More specifically, information may be stored when a user performs an activity and then later retrieved to form an activity network. For example, when a user may make a comment on a post, information may be stored including the text of the comment, information about the user making the comment, the relationship between the post and the comment (e.g., in a threaded conversation the comment is a reply to the post), information about the user who made the post, etc. In retrieving the stored information, the activity graph may include the post and comment as nodes in the graph with an edge connecting the post and the comment. In some implementations, the edge connecting the post and the comment may be unidirectional or bi-directional. In a unidirectional graph, the edge may be directed from the post to the comment to indicate that the comment came after, or was in reply to, the post. In some examples, directional edges may be used to indicate the node that was acted upon and the node that was created by the action.

The method 400 also includes grouping 404 the collection of posts in to an activity cluster of posts based on the activity network. In one implementation, the method 400 is performed by the activity module 1006 discussed in detail with reference to FIG. 10 below. In some instances, the grouping 106 the collection of posts into a first cluster of posts based on the seed post and a first attribute may include the method 400. Likewise, the grouping 108 the collection of posts into a second cluster of posts based on the seed post and a second attribute may include the method 400. In some implementations, the grouping 106 of the first cluster and the grouping 108 of the second cluster may include methods that are different. For example, the grouping 106 of the first cluster may include the method 300 while the grouping 108 of the second cluster may include the method 400. Areas of the activity graph that form a more connected area of the graph may be grouped together. As a brief example, user Adam makes a post on which Bill, Cory and Dominque all make comments. Adam and Cory then comment on Bill's comment and Dominque comments on Adam's comment. Meanwhile, user William merely affirms the post and no further actions are taken by other users regarding William's affirming the post. Thus in some implementations, Adam, Bill, Cory and Dominque's actions may form a cluster that does not include William's isolated affirmation. As another example, a news post that discusses deployment of a fiber optic network within a community may quickly form several clusters in an activity graph. One cluster may form from by those interested in policy making who may be eager to tout the benefits that the community will enjoy with the fiber optic network. Another cluster may form from those interested in discussing the technical aspects of the fiber optic deployment. Yet another cluster may form that focuses on pricing models or availability.

Figure 5:
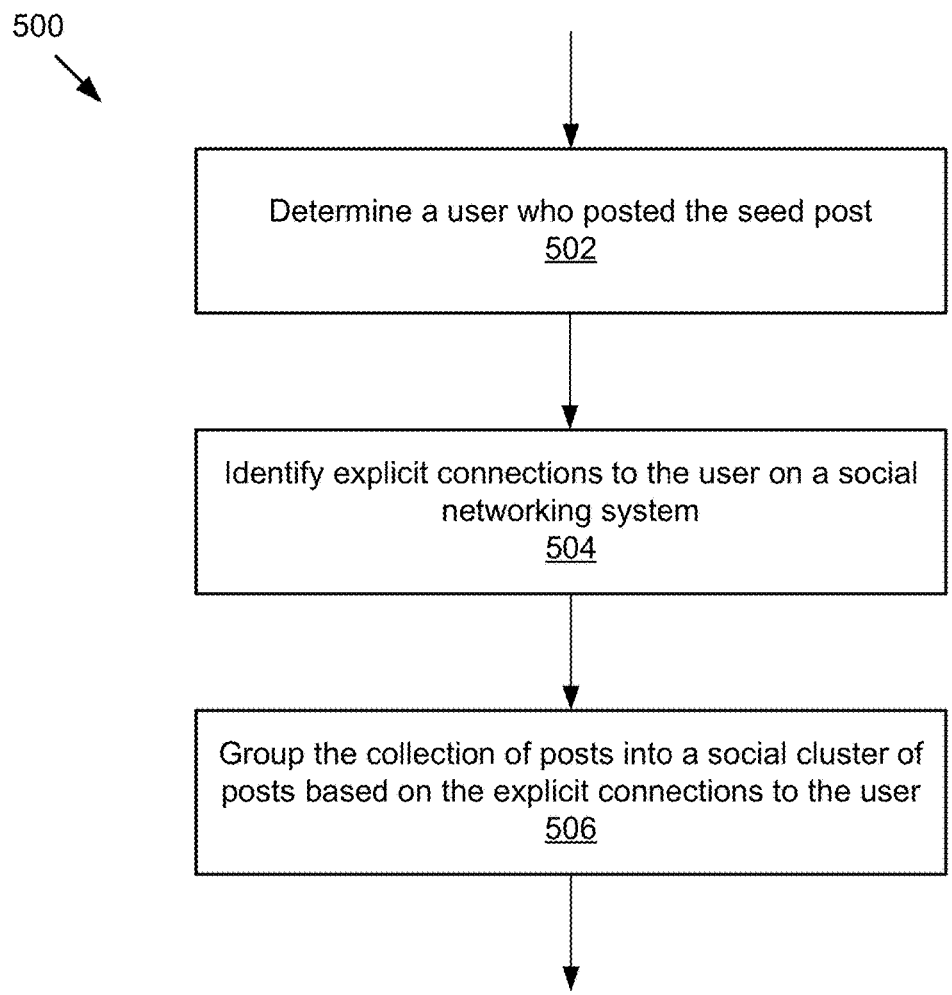
FIG. 5 is a flowchart of an example method for social clustering of content.

FIG. 5 is a flowchart of an example method 500 for social clustering of content. The method 500 includes determining 502 a user who posted the seed post, and identifying 504 explicit connections to the user on a social networking system. A social network is any type of social structure where the users are connected by a common feature. The common feature includes friendship, family, work, an interest, etc. The common features are provided by one or more social networking systems including explicitly-defined relationships and relationships implied by social connections with other users, where the relationships are defined in a social graph. The social graph is a mapping of all users in a social network and how they are related to each other. For example, when a first user follows a second user, the relationship is a first-degree relationship. If the second user follows a third user that the first user does not follow, the first user has a second-degree relationship with the third user. The social graph may have nodes representing users in the social networking system with edges connecting the nodes representing explicit social connections between the nodes representing the users in the social networking system. In some examples, the user who posted the seed post is determined when the post is made to the social networking system. The explicit connection may then be identified by looking up the node representing the user who posted the seed post and identifying edges from that node representing the user to other nodes representing explicit social connections with others to the user who posted the seed post. In some cases, the explicit social connections used in clustering may only include first-degree connections. In other cases, multi-degree connections may be used in clustering. In some examples, the degree of connection between users may be used in grouping the collection of posts into a social cluster. Groups of posts made by users that have lower-degree connections may be weighted as forming a tighter collection of posts, and therefore may be more likely to form a social cluster. In further examples, the degree of connection between users may be used by the ranking module 1010 to rank a collection of posts. In one instance, clusters that are tightly formed may be ranked higher.

The method 500 then groups 506 the collection of posts in to a social cluster of posts based on the explicit connections to the user, degree of relationship, type of relationship and other social factors. Areas of the social graph that form a more connected area of the graph may be grouped together. As a brief example, user Allen may be explicitly connected to Brick, Cynthia and Drexel. Cynthia may be explicitly connected Brick and Drexel while Brick is explicitly connected to Drexel. Further, multiple posts made by Allen, Brick, Cynthia and Drexel have a common tag. Thus in some implementations, Allen, Brick, Cynthia and Drexel's explicit social connection may be used to form a cluster from a group of posts that have a common tag. For instance, each post that was made by Allen, Brick, Cynthia or Drexel may be added to a social cluster based on the explicit connection between Allen, Brick, Cynthia and Drexel. In other words, the explicit connections may be used alone or in combination with other information to form clusters.

Figure 6:
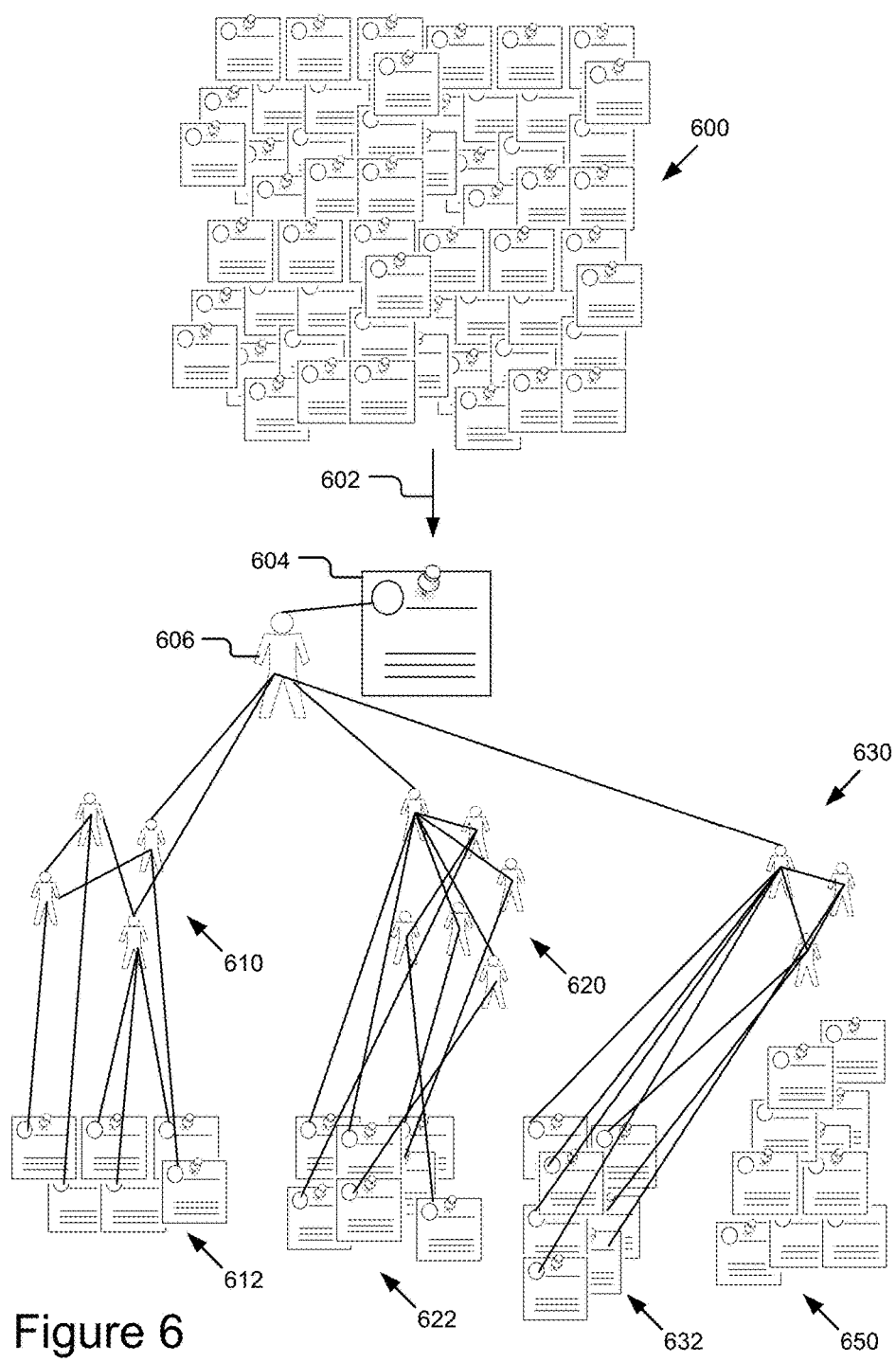
FIG. 6 is a graphic representation of an example of social clustered content.

FIG. 6 is a graphic representation of social clustering of content. A graphic representation of a collection of posts 600 is shown. The collection of posts 600 are processed 602 into various clusters 612, 622 and 632 according to the method described above. An un-clustered group 650 of posts is also shown which includes posts that are not grouped into any of the various clusters 612, 622 and 632. While the graphic representation in FIG. 6 appears to depict posts being grouped into one of the various clusters 612, 622 and 632, or into the un-clustered group 650, it should be noted that in some implementations a given post may be included in several clusters.

A seed post 604 is shown which was posted to a social networking system by a seed user 606. As depicted, the seed user 606 is explicitly connected on the social networking system to other users as indicated by one or more lines connecting the seed user to several groups of users 610, 620 and 630. Within the groups of users 610, 620 and 630, users may be explicitly connected to one another on the social networking system. Thus, the group of users 610 may be connected with one another in such a way to form a group of users. For example, every user in the group 610 may be third-degree connected or less with other users in the group 610.

A user in the groups of users 610, 620 and 630 may post responses to the seed post 604. For example, a user in the group of users 610 may respond to the seed post 604. In this way, the group of users 610 may post to the social networking system a subset 612 of the collection of posts 600. This subset 612 of the collection of posts 600 may be formed through grouping the collection of posts into a social cluster of posts based on the explicit connection to the users in the group of user 610. Thus more generally, through the processing 602 of the collection of posts 600, a user who posted the seed post is determined, explicit connection to the user on a social networking system are identified, and the collection of posts are grouped into social clusters of posts 612, 622 and 632. In processing 602 the collection of posts 600, there may be a subset 650 of the collection of posts that do not cluster with any of the clusters of posts 612, 622 and 632. This subset of posts that do not cluster with any of the clusters of posts 612, 622 and 632 may be referred to as an un-clustered group 650.

Figure 7:
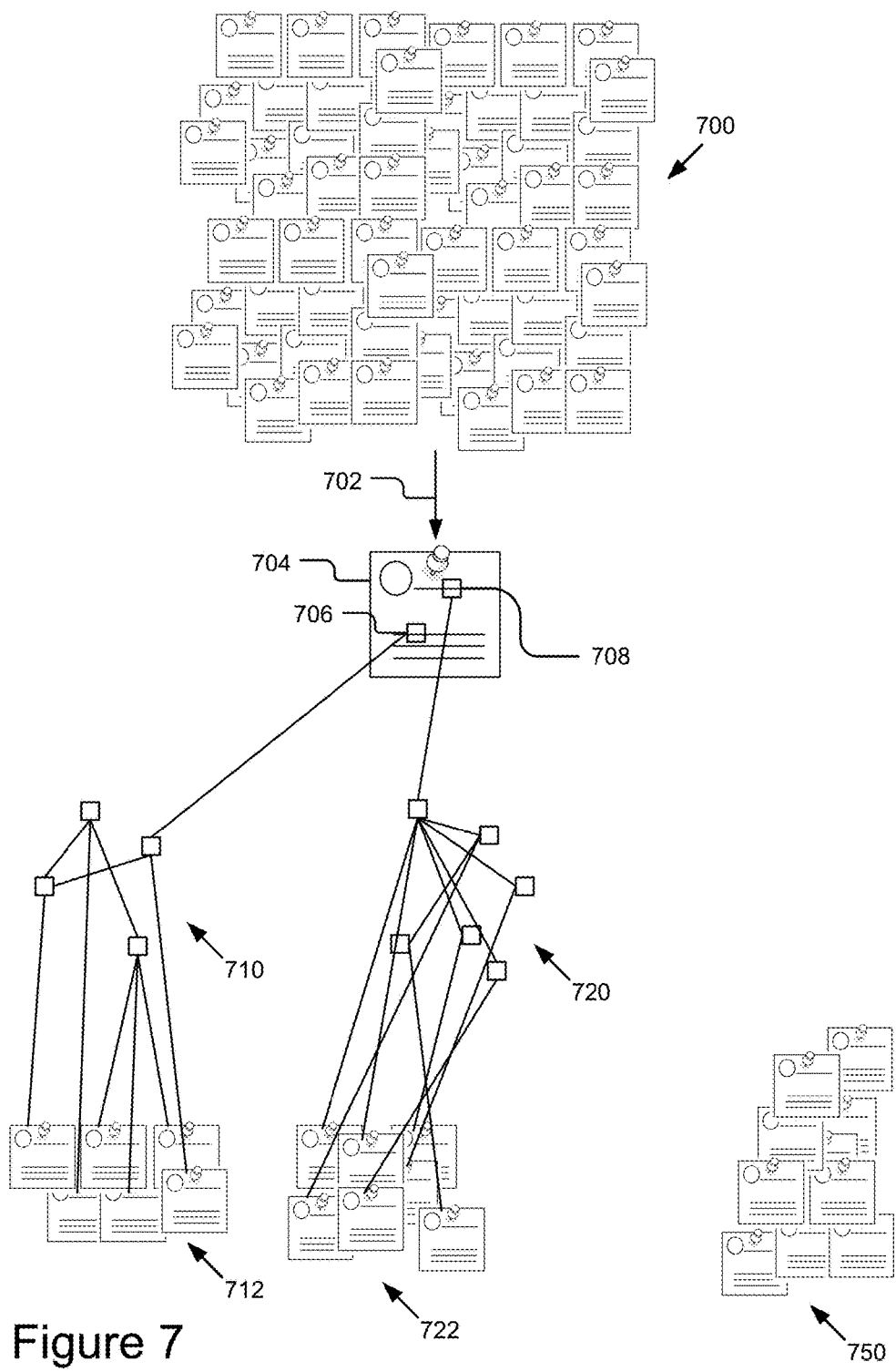
FIG. 7 is a graphic representation of an example of topical clustered content.

FIG. 7 is a graphic representation of topical clustering of content. The collection of posts 700 are processed 702 into various clusters 712 and 722. An un-clustered group 750 is also shown which includes posts that are not grouped into any of the various cluster 712 and 722. While the graphic representation in FIG. 7 appears to depict posts being grouped into one of the various clusters 712 and 722, or into the un-clustered group 750, it should be noted that in some implementations a given post may be included in several clusters.

A seed post 704 is shown which includes various topic entities 706 and 708. Thus, part of the processing 702 of the collection of posts into a cluster of posts includes identifying the topic entities 706 and 708 of the seed post 704. Another part of the processing 702 of the collection of posts into a cluster of posts includes grouping the collection of posts into topical clusters 712 and 722 of posts based on whether content of a post is associated with the topic entities 706 and 708. For example, the seed post 704 may include the tag '#ram' and may have a first topic entity 706 that is 'memory' and a second topic entity 708 that is 'truck'. In this way, the topical cluster 712 may be based on the first topic entity 706—'memory' while the other topical cluster 722 may be based on the second topic entity 708—'truck'.

In some implementations, identifying topic entities 706 and 708 includes extracting a keyword from the seed post 702 and identifying terms semantically related with the keyword. Thus, in the depicted figures, semantically related keywords are connected with lines as shown in 710 and 720. In some implementations, the content of a post is associated with the topic entity if the post includes terms semantically related with the keyword.

Figure 8:
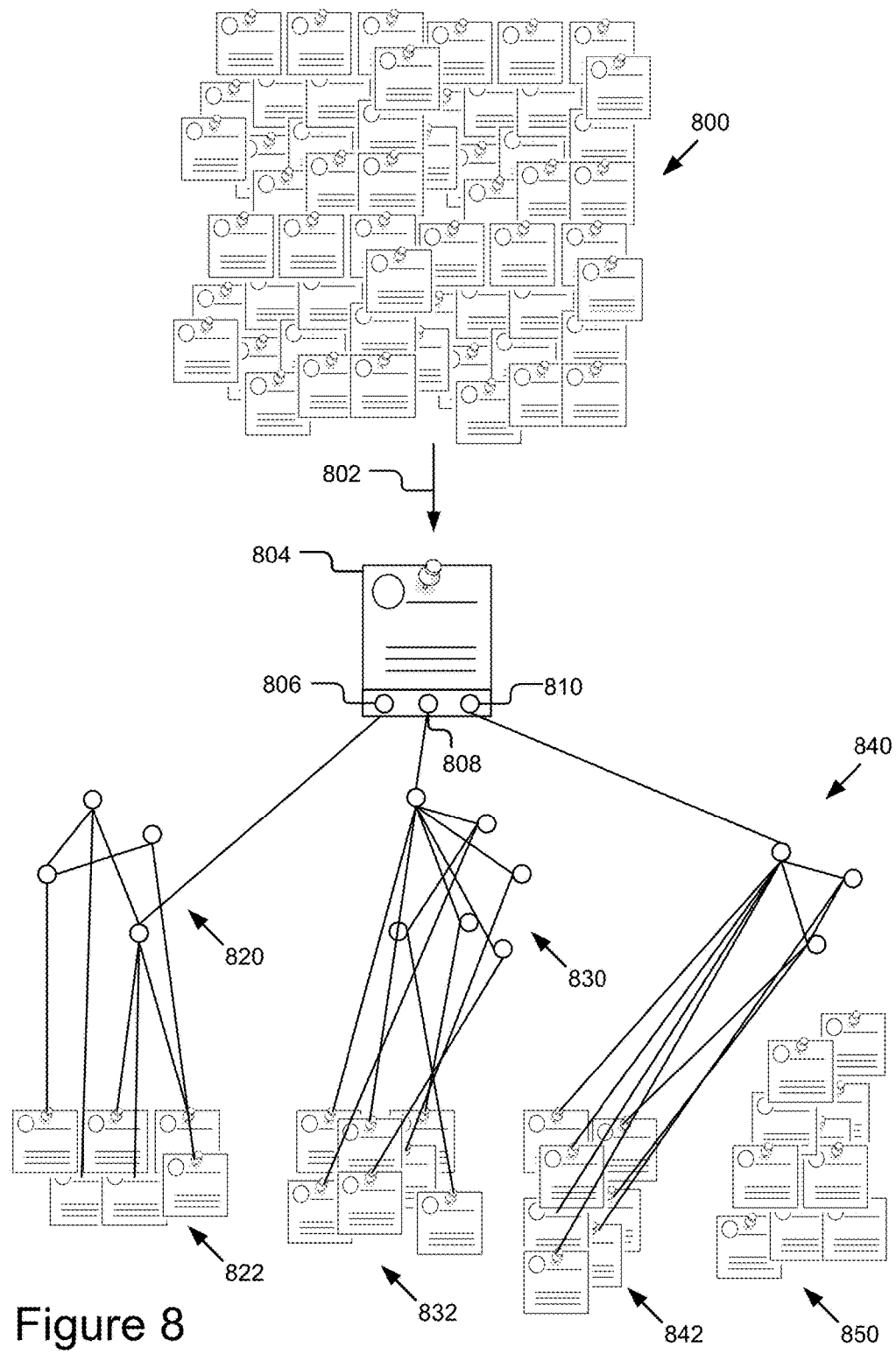
FIG. 8 is a graphic representation of an example of activity clustered content.

FIG. 8 is a graphic representation of activity clustering of content. A graphic representation of a collection of posts 800 is shown. The collection of posts 800 are processed 802 into various clusters 822, 832 and 842. An un-clustered group 850 is also shown which includes posts that are not grouped into any of the various cluster 822, 832 and 842. While the graphic representation in FIG. 8 appears to depict posts being grouped into one of the various clusters 822, 832 and 842, or into the un-clustered group 850, it should be noted that in some implementations a given post may be included in several clusters.

A seed post 804 is shown which was posted to a social networking system. As depicted, the seed post 804 may include an activity network associated with the seed post 804 based on actions 806, 808 and 810 performed by one or more users on a social networking system to the seed post 804. User with groups of actions may form activity networks 820, 830 and 840. For example, the activity network may be formed by users affirming a post, commenting on a post, and re-posting an existing post. Sometimes these actions of users affirming a post, commenting on a post, and re-posting an existing post may be performed against the seed post 804 while other times they may be performed against responses to the seed post, or to other posts in the collection of posts 800.

Thus through the processing 802 of the collection of posts 800, an activity network for the seed post is identified based on actions performed by one or more users on a social networking system to the seed post 804, and the collection of posts are grouped into activity clusters of posts 822, 832 and 842 based on the activity network. In processing 802 the collection of posts 800, there may be a subset 850 of the collection of posts that do not cluster with any of the clusters of posts 822, 832 and 842. This subset of posts that do not cluster with any of the clusters of posts 822, 832 and 842 may be referred to as an un-clustered group 850.

Figure 9:
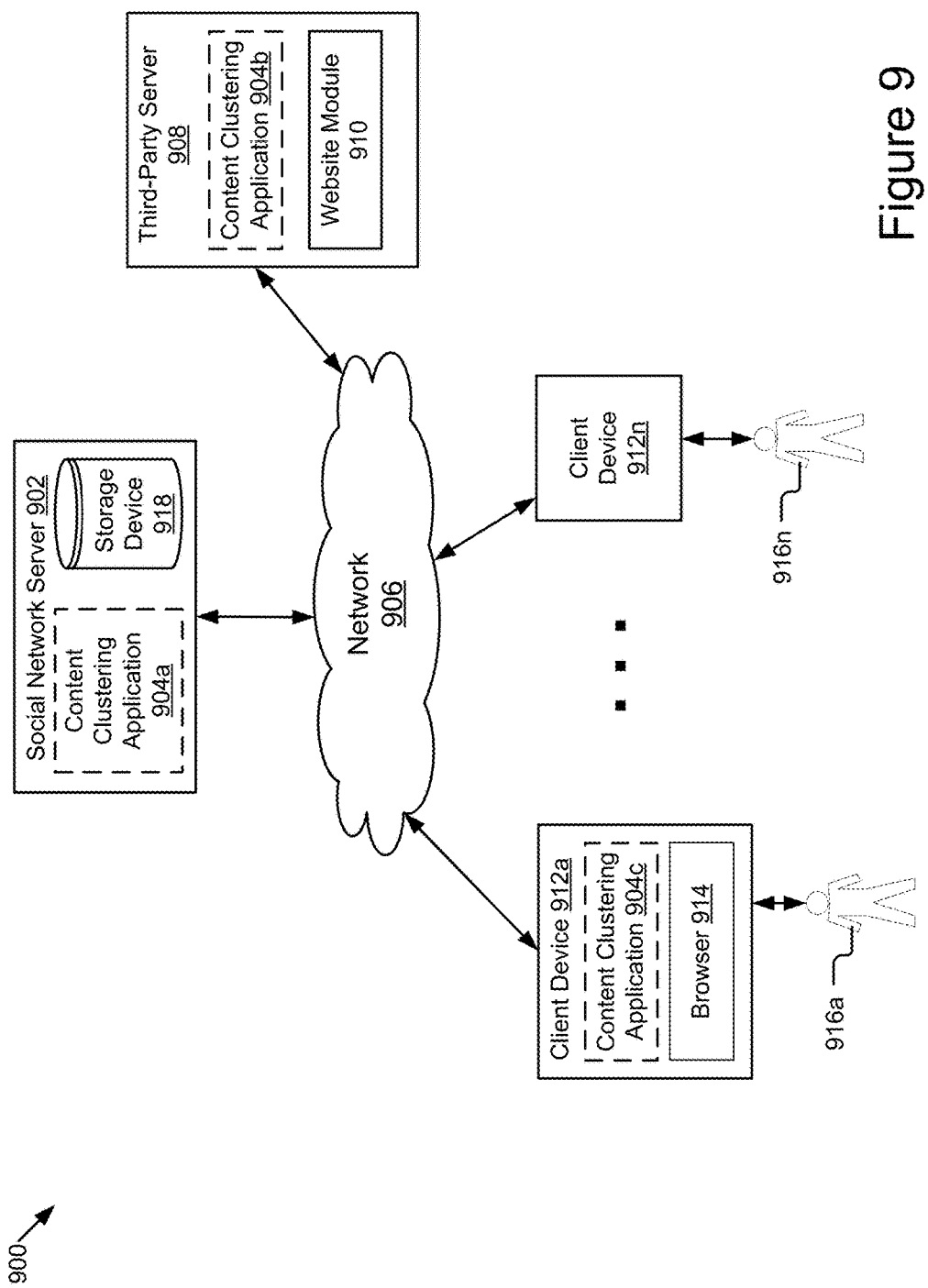
FIG. 9 is a block diagram illustrating an example system for content clustering.

FIG. 9 is a block diagram illustrating an example system 900 for content clustering. The illustrated system 900 includes client devices 912a ... 912n that can be accessed by users 916a ... 916n, a social network server 902 and a third-party server 908. In FIG. 9 and the remaining figures, a letter after a reference number, e.g., "912a," represents a reference to the element having that particular reference number. A reference number in the text without a following letter, e.g., "912," represents a general reference to instances of the element bearing that reference number. In the illustrated implementation, these entities of the system 900 are communicatively coupled via a network 906.

The client devices 912a, 912n in FIG. 9 are used by way of example. While FIG. 9 illustrates two client devices 912a and 912n, the present disclosure applies to a system architecture having one or more client devices 912. Furthermore, although FIG. 9 illustrates one network 906 coupled to the client devices 912, the social network server 902 and the third-party server 908, in practice one or more networks 906 can be connected to these entities.

In some instances, the content clustering application 904a may be operable on the social network server 902, which is coupled to the network 906. The social network server 902 can be a hardware server that includes a processor, a memory and network communication capabilities. In some implementations, the social network server 902 sends and receives data to and from one or more of the client devices 912a, 912n and the third-party server 908 via the network 906. The social network server 902 also includes a storage device 918 and a social network application (not shown) that can be part of the content clustering application 904a or a standalone application.

The storage device 918 stores a social graph that includes the relationship between people in a social network. In some instance, the storage device 918 stores data describing one or more social graphs. A social graph may be a representation of connections between users in a social network. In some instances, the storage device 918 stores data describing explicit and implicit social connections of a social network. In some implementations, an implicit social connection is formed where actions are performed by a user on a social networking system to a seed post. An activity network is formed through one or more implicit social connections. For example, when a user A affirms a seed post provided by user B, user B may form an implicit social connection with user A. If a user C then comments on user B's affirmation of the seed post, another implicit social connection may be formed between user B and user C. Additionally an implicit social connection may be formed between user A and user C. The implicit social connections between user A, user B and user C may form an activity network.

In some instances, the storage device 918 stores post and topic entities of posts and may include a database. In some implementations, a topic entity may be extracted from the text of posts. In some instances, semantically related words may also be identified to generate further terms in a topic entity. In some instances, the storage device 918 stores tags associated with posts.

Furthermore, the social network server 902 may be representative of one social network and there may be multiple social networks coupled to the network 906, each having its own server, application and social graph. For example, a first social network may be more directed to business networking, a second may be more directed to or centered on academics, a third may be more directed to local business, a fourth may be directed to dating and others may be of general interest or a specific focus.

In some instances, the content clustering application 904b may be stored on a third-party server 908, which is connected to the network 906. In some implementations, the third-party server 908 can be a hardware server that includes a processor, a memory and network communication capabilities. The third-party server 908 sends and receives data to and from other entities of the system 900 via the network 906. In some instances the third-party server 908 includes a website module 910 for generating a website. In this example, the content clustering application 904b could be an application programming interface (API) for requesting information from the social network server 902 about content clusters. The website module 910 incorporates the social information into the website. While FIG. 9 includes one third-party server 908, the system 900 may include one or more third-party servers 908.

In some instances, the content clustering application 904c may be stored on a client device 912a, which is connected to the network 906. In some implementations, the client device 912a, 912n may be a computing device that includes a memory and a processor, for example a laptop computer, a desktop computer, a tablet computer, a mobile telephone, a personal digital assistant (PDA), a mobile email device, a portable game player, a portable music player, a television with one or more processors embedded therein or coupled thereto or other electronic device capable of accessing a network 906. In some instances, the client device 912a includes a browser 914 for accessing online services. In the illustrated implementation, the user 916a interacts with the client device 912a. The client device 912n is communicatively coupled to the network 906. The user 916n interacts with the client device 912n. In some instances, the content clustering application 904c acts in part as a thin-client application that may be stored on the client device 912a, 912n and in part as components that may be stored on the social network server 902.

The content clustering application 904 can be code and routines for identifying and providing people in common to a user in a social network. In some instances, the content clustering application 904 can be implemented using hardware including a field-programmable gate array (FPGA) or an application-specific integrated circuit (ASIC). In some other instances, the content clustering application 904 can be implemented using a combination of hardware and software. In some instances, the content clustering application 904 may be stored in a combination of the devices and servers, or in one of the devices or servers.

The network 906 can be a conventional type, wired or wireless, and may have numerous different configurations including a star configuration, token ring configuration or other configurations. Furthermore, the network 906 may include a local area network (LAN), a wide area network (WAN) (e.g., the Internet), and/or other interconnected data paths across which multiple devices may communicate. In some instances, the network 906 may be a peer-to-peer network. The network 906 may also be coupled to or includes portions of a telecommunications network for sending data in a variety of different communication protocols. In some instances, the network 906 includes Bluetooth communication networks or a cellular communications network for sending and receiving data including via short messaging service (SMS), multimedia messaging service (MMS), hypertext transfer protocol (HTTP), direct data connection, WAP, email, etc.

Figure 10:
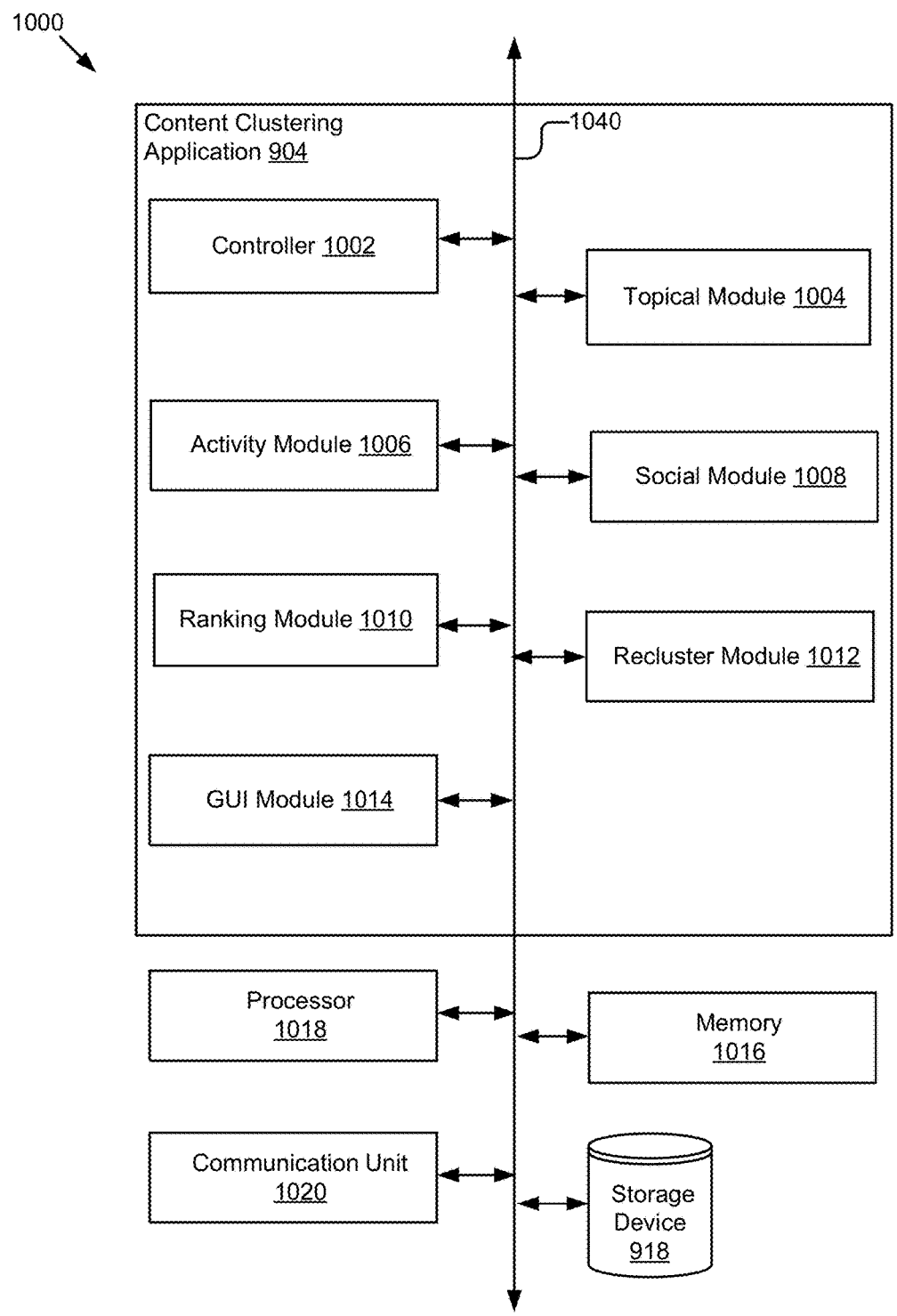
FIG. 10 is a block diagram illustrating an example of a content clustering application.

FIG. 10 is a block diagram illustrating an example of a content clustering application 904. FIG. 10 is a block diagram of a computing device 1000 that includes a content clustering application 904, a processor 1018, a memory 1016 and a communication unit 1020 according to some examples. In some implementations, the computing device 1000 additionally includes a storage device 918. The components of the computing device 1000 are communicatively coupled by a bus 1040. In some instances, the computing device 1000 can be one of a social network server 902, a client device 912 and a third-party server 908.

The processor 1018 includes an arithmetic logic unit, a microprocessor, a general purpose controller or some other processor array to perform computations and provide electronic display signals to a display device. The processor 1018 is coupled to the bus 1040 for communication with the other components. Processor 1018 processes data signals and may include various computing architectures including a complex instruction set computer (CISC) architecture, a reduced instruction set computer (RISC) architecture, or an architecture implementing a combination of instruction sets. Although FIG. 10 includes a single processor 1018, multiple processors 1018 may be included. Other processors, operating systems, sensors, displays and physical configurations are possible.

The memory 1016 stores instructions and/or data that may be executed by the processor 1018. The memory 1016 is coupled to the bus 1040 for communication with the other components. The instructions and/or data may include code for performing the techniques described herein. The memory 1016 may be a dynamic random access memory (DRAM) device, a static random access memory (SRAM) device, flash memory or some other memory device. In some instances, the memory 1016 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 1020 transmits and receives data to and from at least one of the client device 912, the third-party server 908 and the social network server 902 depending upon where the content clustering application 904 may be stored. The communication unit 1020 is coupled to the bus 1040. In some instances, the communication unit 1020 includes a port for direct physical connection to the network 906 or to another communication channel. For example, the communication unit 1020 includes a USB, SD, CAT-5 or similar port for wired communication with the client device 912. In some instances, the communication unit 1020 includes a wireless transceiver for exchanging data with the client device 912 or other communication channels using one or more wireless communication methods, including IEEE 802.11, IEEE 802.16, BLUETOOTH® or another suitable wireless communication method.

In some instances, the communication unit 1020 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some instances, the communication unit 1020 includes a wired port and a wireless transceiver. The communication unit 1020 also provides other conventional connections to the network 906 for distribution of files and/or media objects using standard network protocols including TCP/IP, HTTP, HTTPS and SMTP, etc.

The storage device 918 can be a non-transitory memory that stores data for providing the functionality described herein. The storage device 918 may be a dynamic random access memory (DRAM) device, a static random access memory (SRAM) device, flash memory or some other memory devices. In some instances, the storage device 918 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some instances, the storage device 918 stores data describing one or more social graphs. A social graph may be a representation of connections between users in a social network. In some instances, the storage device 918 stores data describing explicit and implicit social connections of a social network. In some implementations, an implicit social connection is formed where actions are performed by a user on a social networking system to a seed post. An activity network is formed through one or more implicit social connections. For example, when a user A affirms a seed post provided by user B, user B may form an implicit social connection with user A. If a user C then comments on user B's affirmation of the seed post, another implicit social connection may be formed between user B and user C. Additionally an implicit social connection may be formed between user A and user C. The implicit social connections between user A, user B and user C may form an activity network.

In some instances, the storage device 918 stores post and topic entities of posts. In some implementations, a topic entity may be extracted from the text of posts. In some instances, semantically related words may also be identified to generate further terms in a topic entity. In some instances, the storage device 918 stores tags associated with posts.

In the illustrated implementation shown in FIG. 10, the content clustering application 904 includes a controller 1002, a topical module 1004, an activity module 1006, a social module 1008, a ranking module 1010, a recluster module 1012 and a graphical user interface (GUI) module 1014. These components of the content clustering application 904 are communicatively coupled to each other via the bus 1040.

The controller 1002 can be software including routines for handling communications between the content clustering application 904 and other components of the computing device 1000. In some instances, the controller 1002 can be a set of instructions executable by the processor 1018 to provide the functionality described below for handling communications between the content clustering application 904 and other components of the computing device 1000. In some other instances, the controller 1002 can be stored in the memory 1016 of the computing device 1000 and can be accessible and executable by the processor 1018. The controller 1002 may be adapted for cooperation and communication with the processor 1018 and other components of the computing device 1000 via the bus 1040.

The controller 1002 sends and receives data, via the communication unit 1020, to and from one or more of a client device 912, a social network server 902 and a third-party server 908. For example, the controller 1002 receives from a client device 912, via the communication unit 1020, a request for content clusters, identifies which types of content clusters are to be generated and sends the content cluster request to the topical module 1004, the activity module 1006 and/or the social module 1008. In some examples, the controller 1002 receives graphical data for providing a user interface to a user from the GUI module 1014 and sends the graphical data to a client device 912, causing the client device 912 to provide the user interface to the user or present the user interface.

In some instances, the controller 1002 receives data from components of the content clustering application 904 and stores the data in the storage device 918. For example, the controller 1002 may receive tag data, text and other media data for post. In another example, the controller 1002 may receive data describing topic entities from the topical module 1004 and stores the data in the storage device 918.

In some instances, the controller 1002 retrieves data from the storage device 918 and sends the data to components of the content clustering application 904. For example, the controller 1002 retrieves data describing social network connections, e.g. a social graph, from the storage device 918 and sends the data to the social module 1008 to create a social cluster. In some implementations, the controller 1002 may retrieve social network connections and topic entities for posts from the storage device 918. The social network connections together with their corresponding privacy status may be sent to the topical module 1004.

In some instances, the controller 1002 generates a request for grouping a collection of posts into a first cluster of posts based on the seed post and a first attribute and sends the request to one of the topical module 1004, the activity module 1006 and the social module 1008. For example, when a topical cluster is requested, the controller sends the request to the topical module 1004. In some implementations, the controller 1002 may itself identify a seed post from the collection of posts and associate a collection of posts with a common tag. In other implementations, the collection of posts may be associated with a common tag in another module. In some instances, the topical module 1004 may identify a topic entity of the seed post and group the collection of posts into a topical cluster of posts based on whether content of a post is associated with the topic entity.

The topical module 1004 can be software including routines for clustering content into topical clusters. In some instances, the topical module 1004 can be a set of instructions executable by the processor 1018 to provide the functionality described herein for clustering content into topical clusters. In some other instances, the topical module 1004 can be stored in the memory 1016 of the computing device 1000 and can be accessible and executable by the processor 1018. The topical module 1004 may be adapted for cooperation and communication with the processor 1018 and other components of the computing device 1000 via the bus 1040.

In some instances, the topical module 1004 receives, from the controller 1002, a request to group a collection of posts into a topical cluster. In some instances, the topical module 1004 also receives, from the controller 1002, a collection of posts associated with a common tag. The topical module 1004 identifies one or more topic entities of the seed post and groups the collection of posts into a topical cluster of posts based on whether content of a post is associated with the topic entity. For example, the topical module 1004 may scan the text of the seed post and extract keywords from the seed post. The topical module 1004 may then identify semantically related words with the extracted keywords. In one implementation, where there are two or more extracted keywords, the topical module 1004 may retrieve from the storage device 918 terms that are semantically related to a first keyword. The storage device 918 may include an indexed collection of keywords and terms. The topical module 1004 may then retrieve from the storage device terms that are semantically related to the terms that are semantically related to the keyword. The same process may be performed with a second keyword. All of the terms semantically related to the first keyword, either directly or by way of a semantically related term, may then be intersected with the terms semantically related to the second keyword.

The activity module 1006 can be software including routines for clustering content into activity clusters. In some instances, the activity module 1006 can be a set of instructions executable by the processor 1018 to provide the functionality described below for clustering content into activity clusters. In some other instances, the activity module 1006 can be stored in the memory 1016 of the computing device 1000 and can be accessible and executable by the processor 1018. The activity module 1006 may be adapted for cooperation and communication with the processor 1018 and other components of the computing device 1000 via the bus 1040.

In some instances, the activity module 1006 receives, from the controller 1002, a request to group a collection of posts into an activity cluster. In some instances, the activity module 1006 also receives, from the controller 1002, a collection of posts associated with a common tag. The activity module 1006 identifies an activity network for the seed post and groups the collection of posts into an activity cluster of posts based on the activity network. An activity network us based on actions performed by one or more users on a social networking system to the seed post.

The social module 1008 can be software including routines for clustering content into social clusters. In some instances, the social module 1008 can be a set of instructions executable by the processor 1018 to provide the functionality described below for clustering content into social clusters. In some other instances, the social module 1008 can be stored in the memory 1016 of the computing device 1000 and can be accessible and executable by the processor 1018. The social module 1008 may be adapted for cooperation and communication with the processor 1018 and other components of the computing device 1000 via the bus 1040.

In some instances, the social module 1008 receives, from the controller 1002, a request to group a collection of posts into a social cluster. In some instances, the social module 1008 also receives, from the controller 1002, a collection of posts associated with a common tag. The social module 1008 identifies a seed user from the user who posted the seed post. For example, the social module 1008 may query a database stored on the storage device 918 for the user associated with posting the seed post. The social module 1008 may then identify explicit connection to the user on a social networking system. For example. The social module 1008 may query a social network graph directly or may request through the controller the information from an external system. The collection of posts may then be grouped into a social cluster of posts based on the explicit connections to the seed user.

The ranking module 1010 can be software including routines for clustering content. In some instances, the ranking module 1010 can be a set of instructions executable by the processor 1018 to provide the functionality described below for r clusters. In some other instances, the ranking module 1010 can be stored in the memory 1016 of the computing device 1000 and can be accessible and executable by the processor 1018. The ranking module 1010 may be adapted for cooperation and communication with the processor 1018 and other components of the computing device 1000 via the bus 1040.

The ranking module 1010 may rank posts in a content stream based on the clustering. For example, clusters that are tightly formed may be ranked higher. In another example, a social cluster may receive preference by a user and thereby posts in a social cluster may be ranked higher. The ranking module 1010 may receive a collection of posts from the controller and clustering information. The ranking module 1010 may then rank the collection of posts for a presentation in a content stream and the results may be returned to the controller 1002. In some instances, the controller 1002 may then pass the content stream (e.g. the ranked collection of posts) to the graphical user interface (GUI) module 1014 for display to a user.

The recluster module 1012 can be software including routines for clustering content. In some instances, the social module 1008 can be a set of instructions executable by the processor 1018 to provide the functionality described below for reclustering content. In some other instances, the social module 1008 can be stored in the memory 1016 of the computing device 1000 and can be accessible and executable by the processor 1018. The social module 1008 may be adapted for cooperation and communication with the processor 1018 and other components of the computing device 1000 via the bus 1040.

The recluster module 1012 may receive a selection for a new seed post from the GUI module 1014. The recluster module 1012 may also receive a collection of posts with a common tag from the controller 1002 and first attribute to group the collection of posts with. In some implementations, the recluster module 1012 may then invoke execution of the topical module 1004, the activity module 1006 and/or the social module 1008 as appropriate. In some instances, the recluster module 1012 may provide the topical module 1004, the activity module 1006 and/or the social module the seed post and the collection of posts with a common tag. In other implementations, the controller 1002 may handle all or some of the aforementioned data provided to the topical module 1004, the activity module 1006 and/or the social module from the recluster module 1012.

The GUI module 1014 can be software including routines for generating graphical data for providing user interfaces to users. In some instances, the GUI module 1014 can be a set of instructions executable by the processor 1018 to provide the functionality described below for generating graphical data for providing user interfaces. In some other instances, the GUI module 1014 can be stored in the memory 1016 of the computing device 1000 and can be accessible and executable by the processor 1018. The GUI module 1014 may be adapted for cooperation and communication with the processor 1018 and other components of the computing device 1000 via the bus 1040.

In some instances, the GUI module 1014 receives, from the controller module 1002 or from the ranking module 1010, a cluster. In some instances, the GUI module 1014 receives, from the ranking module 1010 a content stream according to an order provided by the ranking module. In some instances, the GUI module 1014 also receives input from user. For instance, the user may select a post to be acted upon using the GUI module 1014 (e.g. read for later, made the new seed post, etc.). The GUI module 1014 may also receive user instruction on how to visualize a cluster, or which types of clusters and/or posts to display and/or hide with the GUI module 1014.

In some implementations, the GUI module 1014 generates graphical data for presenting people in common to the first user. Examples of the graphical user interface are shown in FIGS. 11 and 12.

Figure 11:
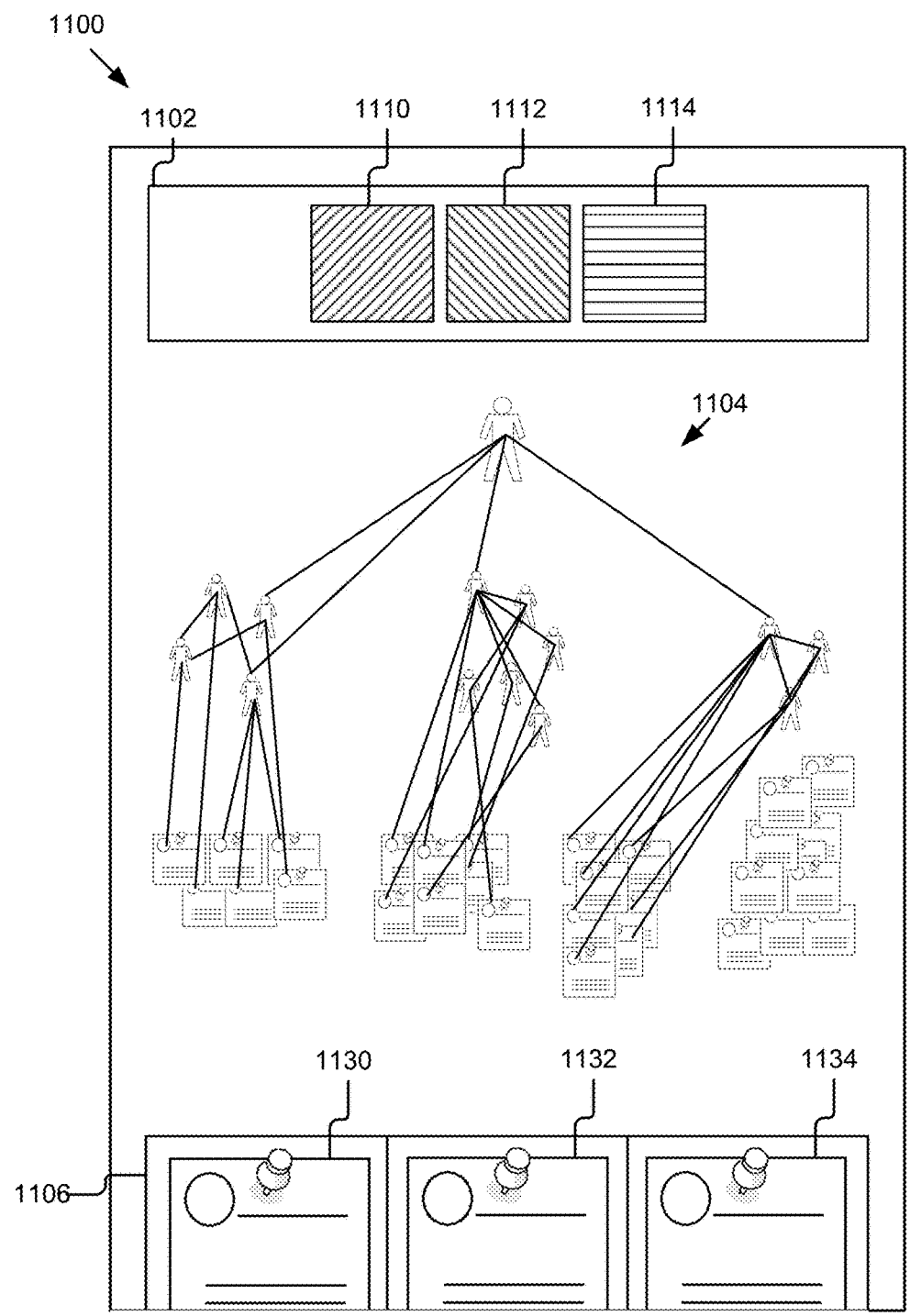
FIG. 11 is a graphic representation of an example user interface for visualizing clusters and displaying posts based on clusters.
Figure 12:
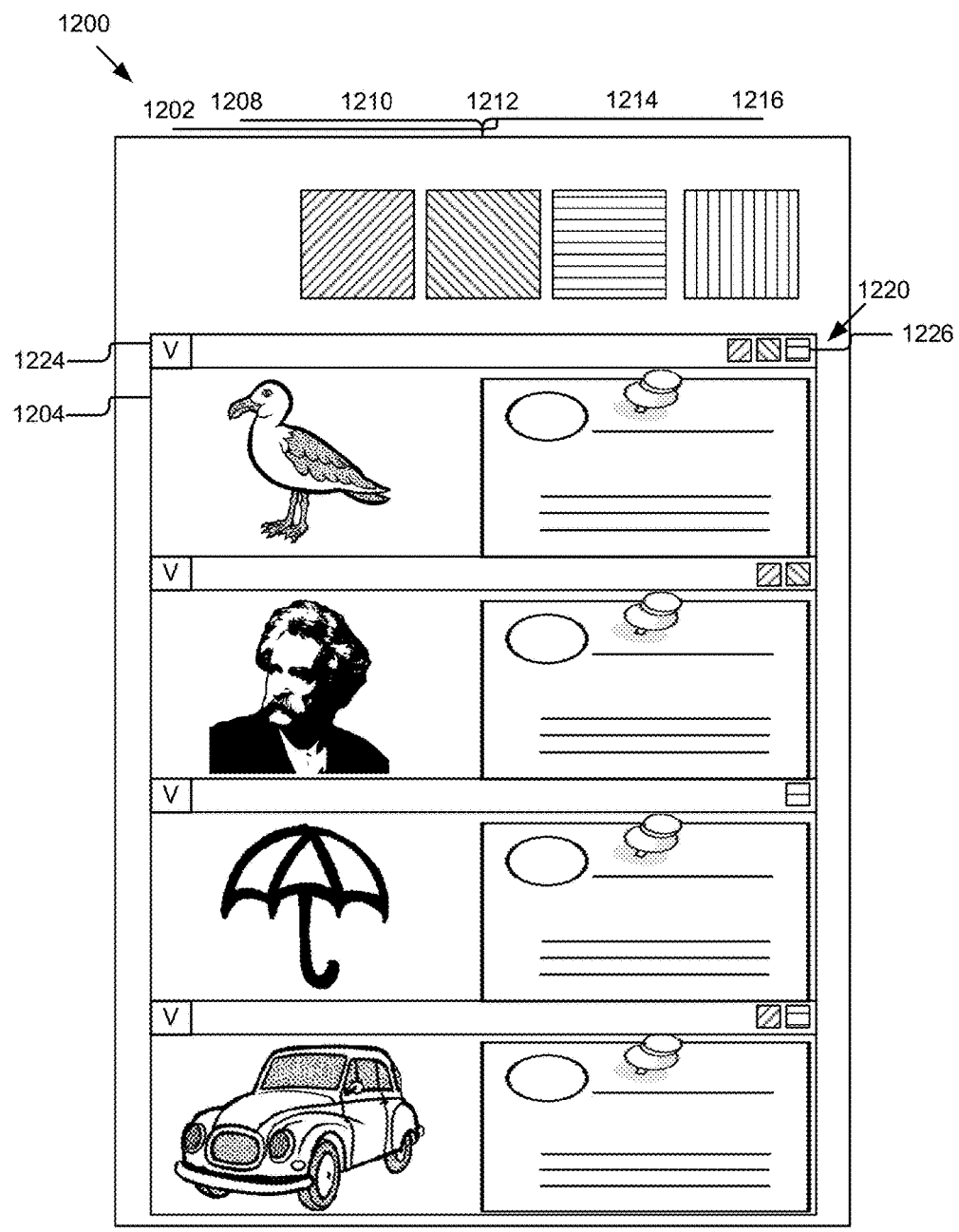
FIG. 12 is another graphic representation of an example user interface for displaying posts based on clusters.

FIG. 11 is a graphic representation of an example user interface 1100 for visualizing clusters and displaying posts based on clusters. The user interface 1100 includes a cluster selection area 1102 with various cluster filters 1110, 1112 and 1114 shown therein. The various cluster filters 1110, 1112 and 1114 may be selectable. By selecting a cluster filter, for example, the cluster filter 1110, the visualized clusters may be limited to the type of cluster that the cluster filter 1110 represents. For example, if the cluster filter 1110 represents an activity cluster filter, and if only the cluster filter 1110 is selected, only activity clusters would be shown. In some cases, the clusters are pre-generated and stored in a database. When the various cluster filters 1110, 1112 and 1114 are selected, the system may query the database for the pre-generated clusters and display them with the user interface 1100. In selecting a cluster filter 1110, 1112 and 1114 the user may indicate to through the user interface 1100 that he wished to view a cluster of posts associated with the cluster filter 1110, 1112 and 1114. In some implementations, the cluster filters 1110, 1112 and 1114 are color coded to indicate a particular type of cluster. For example, an activity cluster may be represented with a purple color while a topical cluster is represented with a green color. In FIG. 11, colors are represented by cross hatching. Thus, as represented in FIG. 11 the activity cluster filter represented by the purple color may be represented by a cross hatching that from the top-left to the bottom-right of the cluster filter 1110.

The user interface 1100 also includes a panel of posts 1106. The panel of posts 1106 may be divided into columns 1130, 1132 and 1134. The columns 1130, 1132 and 1134 may each correspond with a type of cluster in some implementations. In other implementations, the columns 1130, 1132 and 1134 may correspond to all of the selected cluster filters 1110, 1112 and 1114 and may be laid out to provide a comfortable viewing experience for the user of the interface 1100.

In some implementations, users of the interface 1100 are presented with a visualization 1104 of the results of the clustering. The visualization 1104 gives the user a visual indication of the sizes of the clusters. In some instance, the panel of posts includes detailed presentation of the posts that have a common tag and are from people connected to seed identity. In the depicted example, there is a visualization 1104 of a social graphs with adjoining posts to visualize a social cluster. Other implementations include activity graphs to visualize activity clusters and topical graphs to visualize topical cluster. In some examples, each type of visualization (e.g. social graphs, activity graphs and topical graphs) offers a visualization of the clusters and detail views of representative or sample posts from each cluster.

FIG. 12 is another graphic representation of an example user interface 1200 for displaying posts based on clusters. In this implementation, the user interface 1200 includes a cluster selection area 1202 with various cluster filters 1210, 1212 and 1214 shown therein. The various cluster filters 1210, 1212 and 1214 may be selectable. In selecting a cluster filter 1210, 1212 and 1214 the user may indicate to through the user interface 1200 that he wishes to view a cluster of posts associated with the cluster filter 1210, 1212 and 1214. In some implementations, the cluster filters 1210, 1212 and 1214 are color coded to indicate a particular type of cluster. For example, an activity cluster may be represented with a purple color while a topical cluster is represented with a green color. In some implementations, the user may select an un-grouped filter 1216 to indicate to the user interface 1200 that he wishes to view posts that were not grouped into any clusters. In some implementations, the user may select a mixed filter 1208 that indicates to the user interface that the user wishes to see all of the posts. For example, a user may select a post to use as a new seed. In another example, the user may select posts for later reading.

The user interface 1200 includes a list of posts 1220. Each post may include a color code indicators 1226 corresponding to the type of cluster the post is grouped with. In some instances, the color coding shown at a post 1204 in the list of posts 1220 may match the color coding in the cluster selection area 1202. In some implementations, the post 1204 may include a control 1224 to issue commands on the post 1204. In some examples, commands may be issued to the post 1204, the list of posts 1220 or may be issued to the collection of posts. In this way, a selection of posts to be acted upon by a user may be received by the user interface 1200. In some examples, the user interface 1200 may include elements which may indicate which users are related to a post in response to selection, inspection or hover over. In some example, the list of posts 1204 may be ranked into a content stream based on a topical cluster, an activity cluster, and a social cluster. The posts 1204 may include an image, for example, a main photo in a photo post or an image from a site in a link post.

In the above description, for purposes of explanation, numerous specific details are set forth in order to provide a thorough understanding of the specification. It will be apparent, however, that the technology can be practiced without these specific details. In other instances, structures and devices are shown in block diagram form in order to avoid obscuring the description. For example, the present implementation is described in one implementation below primarily with reference to user interfaces and particular hardware. However, the specification applies to any type of computing device that can receive data and commands, and any peripheral devices providing services.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving a collection of tagged posts associated with a first tag, the first tag including a homonym with a first definition and a second definition;
   subsequent to receiving the collection of tagged posts associated with the first tag, identifying a seed post from the collection of tagged posts associated with the first tag;
   grouping a first set of posts from the collection of tagged posts associated with the first tag into a first cluster of posts with the first definition of the homonym based on the seed post and a first attribute;
   grouping a second set of posts from the collection of tagged posts associated with the first tag into a second cluster of posts with the second definition of the homonym based on the seed post and a second attribute;
   receiving a selection from a user of a view from at least one or more of the first cluster and the second cluster;
   sizing the view to present a number of posts based on a comparison to a threshold; and
   providing, for display on a device being used by the user, the view.

2. The method of claim 1, further comprising:
   grouping the collection of tagged posts into a third cluster of posts based on the seed post and a third attribute,
   wherein the providing for display provides at least one or more of: the first cluster, the second cluster and the third cluster.

3. The method of claim 1, further comprising:
   identifying a new seed post from the collection of tagged posts;
   grouping the collection of tagged posts into a third cluster of posts based on the new seed post and the first attribute; and
   grouping the collection of tagged posts into a fourth cluster of posts based on the new seed post and the second attribute.

4. The method of claim 1, wherein grouping the collection of tagged posts into the first cluster of posts comprises:
   identifying a topic entity of the seed post; and
   grouping the collection of tagged posts into a topical cluster of posts based on whether content of a post is associated with the topic entity.

5. The method of claim 4, further comprising:
   identifying terms semantically related with a keyword,
   wherein identifying the topic entity comprises extracting the keyword from the seed post,
   wherein the content of the post is associated with the topic entity when the post includes terms semantically related with the keyword.

6. The method of claim 1, wherein grouping the collection of tagged posts into the first cluster of posts comprises:
   determining a posting user who posted the seed post;
   identifying explicit connections to the posting user on a social networking system; and
   grouping the collection of tagged posts into a social cluster of posts based on the explicit connections to the posting user within a social graph.

7. The method of claim 1, further comprising receiving a selection of posts from the user.

8. The method of claim 1, further comprising ranking posts provided in a content stream based on at least one from a group of a topical cluster, an activity cluster, and a social cluster.

9. The method of claim 1, wherein grouping the collection of tagged posts into the first cluster of posts comprises:
   identifying an activity network for the seed post based on actions performed by one or more users on a social networking system to the seed post; and
   grouping the collection of tagged posts into an activity cluster of posts based on the activity network.

10. The method of claim 9, wherein the activity network is based on one or more of actions on the social networking system selected from: affirming the seed post, commenting on the seed post, and re-posting the seed post.

11. A system comprising:
    one or more processors; and
    a memory storing instructions that, when executed, cause the system to:
      receive a collection of tagged posts associated with a first tag, the first tag including a homonym with a first definition and a second definition;
      subsequent to receiving the collection of tagged posts associated with the first tag, identify a seed post from the collection of tagged posts associated with the first tag;
      group a first set of posts from the collection of tagged posts associated with the first tag into a first cluster of posts with the first definition of the homonym based on the seed post and a first attribute;
      group a second set of posts from the collection of tagged posts associated with the first tag into a second cluster of posts with the second definition of the homonym based on the seed post and a second attribute;
      receive a selection from a user of a view from at least one or more of: the first cluster and the second cluster;
      size the view to present a number of posts based on a comparison to a threshold; and provide, for display on a device being used by the user, the view.

12. The system of claim 11, wherein the memory further stores instructions that, when executed, cause the system to:
group the collection of tagged posts into a third cluster of posts based on the seed post and a third attribute,
wherein the providing for display provides at least one or more of: the first cluster, the second cluster and the third cluster.

13. The system of claim 11, wherein the memory further stores instructions that, when executed, cause the system to:
identify a new seed post from the collection of tagged posts;
group the collection of tagged posts into a third cluster of posts based on the new seed post and the first attribute; and
group the collection of tagged posts into a fourth cluster of posts based on the new seed post and the second attribute.

14. The system of claim 11, wherein grouping the collection of tagged posts into the first cluster of posts comprises:
identify a topic entity of the seed post; and
group the collection of tagged posts into a topical cluster of posts based on whether content of a post is associated with the topic entity.

15. The system of claim 14, wherein the memory further stores instructions that, when executed, cause the system to:
identify terms semantically related with a keyword,
wherein identifying the topic entity comprises extracting the keyword from the seed post,
wherein the content of the post is associated with the topic entity when the post includes terms semantically related with the keyword.

16. The system of claim 11, wherein grouping the collection of tagged posts into the first cluster of posts comprises:
determining a posting user who posted the seed post;
identifying explicit connections to the posting user on a social networking system; and
grouping the collection of tagged posts into a social cluster of posts based on the explicit connections to the posting user within a social graph.

17. The system of claim 11, wherein the memory further stores instructions that, when executed, cause the system to receive a selection of posts from the user.

18. The system of claim 11, wherein the memory further stores instructions that, when executed, cause the system to rank posts provided in a content stream based on at least one or more of: a topical cluster, an activity cluster, and a social cluster.

19. The system of claim 11, wherein grouping the collection of tagged posts into the first cluster of posts comprises:
identifying an activity network for the seed post based on actions performed by one or more users on a social networking system to the seed post; and
grouping the collection of tagged posts into an activity cluster of posts based on the activity network.

20. The system of claim 19, wherein the activity network is based on one or more of actions on the social networking system selected from: affirming the seed post, commenting on the seed post, and re-posting the seed post.

21. A computer program product comprising a non-transitory computer usable medium including a computer readable program, wherein the computer readable program when executed on a computer causes the computer to:
receive a collection of tagged posts associated with a first tag, the first tag including a homonym with a first definition and a second definition;
subsequent to receiving the collection of tagged posts associated with the first tag, identify a seed post from the collection of tagged posts;
group a first set of posts from the collection of tagged posts associated with the first tag into a first cluster of posts with the first definition of the homonym based on the seed post and a first attribute;
group a second set of posts from the collection of tagged posts associated with the first tag into a second cluster of posts with the second definition of the homonym based on the seed post and a second attribute;
receive a selection from a user of a view from at least one or more of: the first cluster and the second cluster;
size the view to present a number of posts based on a comparison to a threshold; and
provide, for display on a device being used by the user, the view.

* * * * *